United States Patent [19]

Röhm

[11] Patent Number: 4,619,461
[45] Date of Patent: Oct. 28, 1986

[54] HAMMER DRILL APPARATUS

[76] Inventor: Günter H. Röhm, Heinrich-Röhm-Strasse 50, D-7927 Sontheim, Fed. Rep. of Germany

[21] Appl. No.: 719,760

[22] Filed: Apr. 4, 1985

[30] Foreign Application Priority Data

May 8, 1984 [DE] Fed. Rep. of Germany ....... 3416946

[51] Int. Cl.⁴ .......................................... B23B 31/08
[52] U.S. Cl. .................................. 279/19.3; 173/48; 279/62
[58] Field of Search ............... 279/1 K, 1 ME, 60–65, 279/19, 19.3–19.5, 1 R, 1 B, 81, 89, 90, 93, 76, 79, 80; 173/47, 48, 114, 115; 408/241 R; 409/231, 232, 234

[56] References Cited

U.S. PATENT DOCUMENTS

| 3,133,601 | 5/1964 | Fulop | 173/115 X |
| 3,929,343 | 12/1975 | Wanner et al. | 279/81 X |
| 4,491,444 | 1/1985 | Rumpp et al. | 173/48 X |

FOREIGN PATENT DOCUMENTS

| 356396 | 9/1961 | Switzerland | 173/47 |
| 2030485 | 4/1980 | United Kingdom | 279/60 |

Primary Examiner—Gil Weidenfeld
Assistant Examiner—Steven C. Bishop
Attorney, Agent, or Firm—Karl F. Ross; Herbert Dubno

[57] ABSTRACT

A drill chuck is rotatably driven by a drill spindle, on which the drill chuck is mounted by a plurality of radial lugs so as to prevent relative rotation, these lugs engaging in catch recesses in the drill chuck, which allow axial free play of the drill chuck on the drill spindle, unless prevented by adjusting a shift member mounted adjustably on the drill chuck without contact with and with axial clearance from the drill spindle. The lugs are rigidly connected with the drill spindle and lie axially against adjacent opposing shift member surfaces on both sides of the drill chuck. According to the rotary position of a shift member the lugs press directly on the adjacent shift member surfaces preventing axial free play of the drill chuck on the drill spindle and transmitting the drilling force or they lie opposite indentations in the shift member with clearance from the shift member surface so as to allow axial motion free play. As a result during drilling the shift member does not bear the force of the drilling.

11 Claims, 3 Drawing Figures

HAMMER DRILL APPARATUS

CROSS REFERENCE TO RELATED APPLICATIONS

This application relates especially to commonly assigned copending applications: Ser. No. 658,133 filed 5 Oct. 1984, Ser. No. 686,243 filed 26 Dec. 1984, Ser. No. 692,902 of 18 Jan. 1985, Ser. No. 692,907 of 18 Jan. 1985, Ser. No. 702,049 and Ser. No. 702,053 of 15 Feb. 1985 and Ser. No. 703,888 of 21 Feb. 1985; and most particularly; Ser. No. 720,259 filed 5 Mar. 1985. See also the applications Ser. No. 646,621 filed 31 Aug. 1984 and Ser. No. 726,596 filed 23 Apr. 1985 based upon German applications Nos. P 34 16964.9 and P 31 16966.0 of 8 May 1984.

FIELD OF THE INVENTION

My invention relates to a hammer drill and, more particularly, to a hammer drill apparatus, wherein a drill chuck is attached to a drill spindle in one of two mounting configurations in both of which rotation of the drill chuck relative to the drill spindle is prevented (i.e. the chuck is keyed to the spindle for rotation therewith) but in one of which limited axial free play of the drill chuck on the drill spindle is allowed and in the other prevented and wherein the drill chuck is switched between the two mounting configurations by a shift member of the hammer drill apparatus.

BACKGROUND OF THE INVENTION

A hammer drill apparatus can comprise a drill chuck mounted on a drill spindle having an axial passage, through which the hammer stroke is transmitted by an impactor or ram through the hollow drill spindle, to the end of a drill bit held by an array of clamp jaws of the drill chuck.

Means are provided for coupling of the drill chuck to the drill spindle, while preventing drill chuck rotation relative to the drill spindle, which also permit an axial play of the drill chuck on the drill spindle, unless the axial play of the drill chuck on the drill spindle is prevented by adjustment of the shift member on the drill chuck.

In my German patent application No. P 34 13 581.2 and the corresponding U.S. application Ser. No. 720,259 an improved hammer drill apparatus of this kind is described.

The coupling members effecting the keying of chuck to spindle are axial pins, which are engaged in cavities in both the drill spindle and the chuck body of the drill chuck. The cavities have a greater extent in the chuck body than the size of the pins and allow of course the desired axial play of the drill chuck on the drill spindle, while preventing rotary slip of the drill chuck on the drill spindle.

In this device the shifting member or piece is a coupling sleeve guided rotatably, but axially unshiftable, on the chuck body and about the drill spindle. This coupling sleeve is positioned axially adjacent a circular shoulder of the drill spindle and carries projections directed against that circular shoulder, which prevent axial motion free play of the drill chuck on the drill spindle by pressing on the circular surface of the circular shoulder of the drill spindle. However on the circular surface of that circular shoulder indentations are provided, in which the projections fit in at least to a depth equal to the displacement of the drill chuck during the axial play.

The coupling sleeve is rotatable so that the projections come into coincidence with indentations and can enter the indentations. Thus this arrangement provides the desired axial free play of the drill chuck on the drill spindle. However the axially directed force of the drilling is transmitted by the coupling sleeve in this apparatus since it is supported on a circular shoulder of the chuck body and also presses directly against the circular shoulder of the drill spindle, when the shift member is rotated to permit axial play. For transmission of the drilling force the coupling sleeve and its support on the chuck body must be constructed so as to be sufficiently stable.

OBJECTS OF THE INVENTION

It is an object of my invention to provide an improved hammer drill apparatus in which it is possible to directly transmit the force of drilling of the drill spindle to the drill chuck so that the shift member does not bear any of the force of the drilling.

It is thus an object of this invention to provide a drilling apparatus for a hammer or rotary impact drill which extends the principles of the last mentioned U.S. application.

It is another object of this invention to provide an improved hammer drill apparatus having a drill chuck adjustable between a position in which axial play of the drill chuck on the drill spindle is allowed during drilling and a position in which axial motion free play is prevented.

It is a further object of this invention to provide an improved hammer drill apparatus having a drill chuck mounted without rotary slip on a drill spindle, the drill chuck having a shift member for rotating the drill chuck between a position in which axial motion free play is allowed and one wherein it is not, wherein the shift member does not bear any of the force of drilling.

SUMMARY OF THE INVENTION

These objects and others which will become apparent hereinafter are attained in accordance with my invention in a hammer drill apparatus comprising a drill chuck mounted on and driven by a drill spindle having an axial passage through which the hammer stroke of an impactor or ram guided down through the hollow drill spindle is transmitted to the end of a drill bit held between centrally adjustable clamp jaws in the drill chuck, wherein a plurality of entrainers, catches or lugs are provided for mounting of the drill chuck on the drill spindle without rotary slip or rotation of the drill chuck relative to the drill spindle, so as to allow an axial play of the drill chuck on the drill spindle, unless the axial play is prevented by adjustment of a shift or switch member guided on the drill chuck.

According to my present invention the shift member is mounted on the chuck body without contact with and with axial clearance from the drill spindle. Furthermore the radially projecting lugs are rigidly connected with the drill spindle, and are positioned so as to lie opposite juxtaposed or confronting shift member surfaces axially on both sides of the drill chuck. According to the rotational position of the shift member the lugs lie locked in position against the shift member surfaces or separated with clearance from the shift member surfaces, in order that the axial motion free play of the drill chuck on the drill spindle is allowed.

In the position of the shift member, in which a shift member surface lies axially in pressing engagement against the lugs, all axial motion free play of the drill chuck on the drill spindle is prevented.

On the other hand in the other position of the shift member, in which a shift member surface is separated with clearance from the respective lug in order that the axial play of the drill chuck on the drill spindle is allowed, the play of the drill chuck results directly when this position is assumed.

In each case the transmission of the force of the drilling occurs directly on and directly by contact of the catches on the chuck body, and of course in rotation as well as in axial movement to the front, i.e. toward the drill side of the drill chuck. The shift member of my invention does not bear the force of the drilling and only has the task of coupling the drill chuck axially on the drill spindle for drilling.

It is a feature of this invention that the chuck body of the drill chuck on its end closest to the drill spindle is formed with a chuck body collar, in which catch recesses are constituted as radial slots, and the shift member is a shift sleeve rotatably mounted axially unshiftably on the chuck body.

The shift sleeve overhangs the lugs on their sides axially facing the drill spindle with an inwardly directed collar, on which is formed at least one shift surface for the catches, which functions as the first shift surface for preventing axial free play of the drill chuck on the drill spindle.

Furthermore a second shift surface set back axially from the first, can be formed on the shift sleeve permitting axial motion free play of the drill chuck.

Advantageously catch recesses open on their sides axially facing to the drill spindle and the first shift surface of the shift member preventing axial play of the drill chuck on the drill spindle are formed by the planar circular surface of the shift sleeve inner collar adjacent the chuck body.

A plurality of indentations are provided in this circular surface, which have a depth equal to the displacement of the drill chuck during axial motion free play, and in one rotational position of the shift member these indentations coincide with the catch recesses, or slots, so that the lugs can enter in the suitably constructed indentations, wherein the bottoms of the indentations form the second shift surface, which limits the axial free play.

Advantageously the slot side walls and the slot bottoms of the catch recesses as well as the bottoms of the indentations are formed by planar surfaces, which lie against the corresponding planar surfaces of the lugs. The opposing side planar surfaces result in an advantageously smaller specific surface load for the transmission of the drilling force.

According to my invention, moreover, the lugs protrude from a sleeve, which is secured on the drill spindle and the end of the sleeve closest the drill spindle presses on a first circular shoulder of the drill spindle, while the other end of the sleeve is supported on a second circular shoulder of the chuck body inside of the chuck body collar. The sleeve in addition to the lugs then transmits the force of drilling between the drill spindle and the drill chuck.

The shift member is adjustably mounted with its inner collar axially on the chuck body collar and by a supporting member engaged in a circular shaped undercut portion of the chuck body. The supporting member is a compressible ring, which is inserted in a circular groove in the shift member.

The shift member can have, moreover, a locking mechanism, which holds it in the rotary position with and the position without drill chuck axial play. Advantageously the locking mechanism comprises a spring-loaded locking pin guided radially adjustably in the shift member and locking indentations provided in the chuck body in which the locking pin is engaged.

Advantageously in a best-mode embodiment of the invention two lugs, two indentations and two slots are provided. However other embodiments are possible having four or more catches, catch recesses and their corresponding indentations.

BRIEF DESCRIPTION OF THE DRAWING

The above and other objects, features and advantages of my invention will become more readily apparent from the following detailed description, reference being made to the accompanying drawing in which.

SPECIFIC DESCRIPTION

Figure 3:
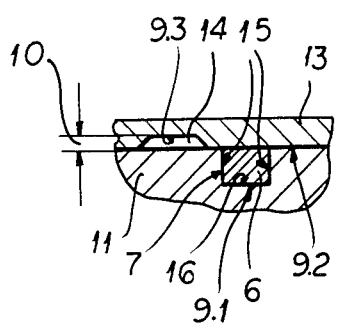
FIG. 3 is a cross sectional view of the apparatus of FIG. 1 taken along the section line III—III thereof.

The hammer drill apparatus shown in the drawing comprises a partially shown drill spindle 1 of a hammer drill, which rotatably drives a drill chuck 2. This drill chuck 2 has an axial passage 3 through which the hammer stroke is applied by a ram 4 through the hollow drill spindle 1 to the end of a drill bit (not shown) held between centrally adjustable clamp jaws 5 in the drill chuck 2.

For rotatable attachment of the drill chuck 2 to the drill spindle 1 a plurality of lugs 6 are provided, which are received in recesses or slots 7 in the chuck body 11 of drill chuck 2 preventing relative rotation of the chuck 2 on the drill spindle 1.

Preferably there are two lugs 6 provided. These lugs 6 allow axial play of the drill chuck 2 on the drill spindle 1. This play, however, can be prevented by rotating a shift member 8 guided on drill chuck 2.

The lugs 6 are rigidly connected with the drill spindle 1 and protrude radially from it. These lugs 6 lie on opposite sides of the drill chuck 2 axially adjacent the planar shift surfaces 9.1, 9.2 and 9.3 of the shift member 8 and the chuck body 11. Planar surfaces of each lug confront these surfaces.

Figure 1:
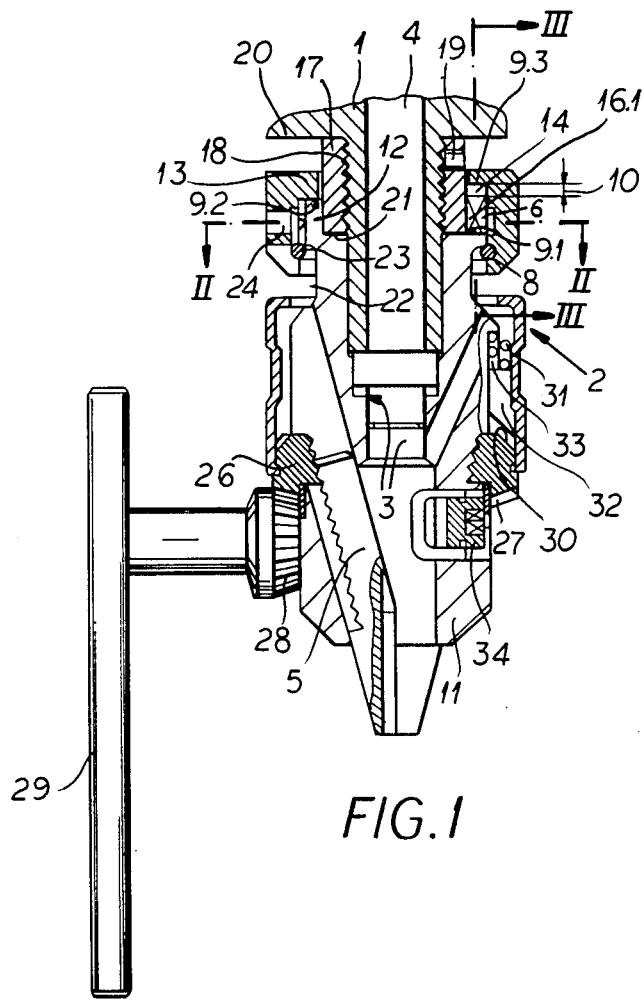
FIG. 1 is an axial cross section taken along line I—I of FIG. 2 of a hammer drill apparatus according to the invention.
Figure 2:
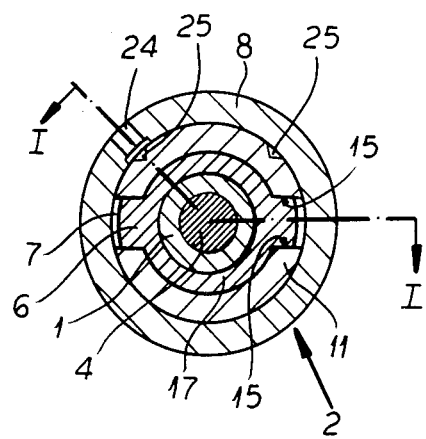
FIG. 2 is a cross sectional view through the hammer drill apparatus according to FIG. 1 taken along the section line II—II thereof.

According to the rotational position of the shift member 8 the lugs 6 can fit exactly in the catch recesses 7 as shown in FIG. 3 or as shown in FIG. 1 the lugs 6 lie spaced from the shift member 8 with clearance as indicated by the double arrows 10, thus providing the desired axial play.

In particular the end of the chuck body 11 of the drill chuck 2 adjacent the drill spindle 1 is provided with drill chuck collar 12, in which the catch recesses 7 are constructed as radially directed slots.

The shift member 8 is a guided shift ring axially unshiftable but rotatable on the chuck body 11, which overhangs the upper sides of the lugs 6 turned axially toward the drive of the spindle, with its inwardly directed inner collar 13, on which the shift member surfaces 9.2 and 9.3 are formed adjacent and confronting the lugs 6.

The catch recesses 7 are open on their axially directed drill spindleward sides. The shift member surface 9.2 which prevents axial free play of the drill chuck 2 on the drill spindle 1 is formed on the inner planar ring surface of the inner collar 13.

On the ring surface of the latter indentations 14 are provided, which have an axial depth indicated by double arrows 10 which corresponds to the amplitude of the free play of the drill chuck 2 on the drill spindle 1 and into which the lugs 6 fit.

According to the rotary position of the shift member 8 the indentations 14 lie opposite the catch recesses 7, so that the lugs 6 can enter the indentations 14, whereby the bottom of these indentations 14 form the surfaces 9.3 limiting the axial play on the drill spindle side of the lugs 6.

The slot side walls 15 and the slot bottoms 16 of the catch recesses 7 and the bottom of the indentations 14 are formed by planar surfaces, which lie against the corresponding planar surfaces 16.1 of the lugs 6.

Moreover the lugs 6 protrude from a cylindrical sleeve 17, which is screwed on a thread 18 on the drill spindle 1 and is secured thereon by a setscrew 19.

The end of the sleeve 17 facing the spindle drive (e.g. an electric motor) presses on a first circular shoulder 20 of the drill spindle 1, while the other end is supported inside of chuck body collar 12 on a second circular shoulder 21 of chuck body 11, so that the axial drilling force of the circular shoulder 20 of the drill spindle 1 can be transmitted directly by the sleeve 17 and the lugs 6 by direct contact with the drill spindle 1 and the chuck body 11.

The shift member 8 remains thereby free from any stress or load. It is guided by its inner collar 13 on chuck body collar 12 of the chuck body 11 at the end of shift member 8 turned toward the spindle and at its other end by a supporting member 23 in the form of a compressible ring (spring ring) inserted in a circular groove in shift member 8, this supporting member 23 being engaged in a circular shaped undercut portion 22 of chuck body 11.

Moreover this shift member 8 is provided with a locking mechanism or detent which retains it in each of its two positions, the one allowing, the other preventing axial play of the drill chuck 2 on the drill spindle 1.

This detent comprises a spring-loaded locking pin 24 (shown in its sleeve) radially shiftable in member 8 and associated locking indentations 25 provided in the chuck body 11 in which the locking pins 24 are engaged. Preferably two locking indentations 25 are provided, one corresponding to the position of the shift member 8 in which axial free play of the drill chuck 2 is allowed, the other corresponding to the position of the shift member 8 in which axial free play of the drill chuck 2 is prevented.

Moreover the drill chuck 2 shown in the drawing has a number of widely-used customary features that have been previously employed. The clamp jaws 5 are guided to and from the center of the chuck body 11, an axially unshiftable, but rotatable, adjustable ring 26 serving for adjustment of the clamp jaws 5 in chuck body 11, the inner teeth of the adjustable ring 26 engaging in the teeth of the clamp jaws 5.

The adjustable ring 26 has external gear teeth 27 for engagement in the pinion gear 28 of a key 29 insertable in the drill chuck 11 for tightening or loosening the adjustable ring 26. The adjustable ring 26 has a clearance space 30 on its side opposite to the side having the gear teeth 27, in which at least one axially shiftable lock bolt 32 under the force of the spring 31 engages and holds the adjustable ring 26 in the chuck body 11. The clearance space 30 and the end of the lock bolt 32 engaged with the adjustable ring 26 are provided with slanting sides, which of course on the one hand prevent self-rotation of the adjustable ring 26, but on the other hand allow the lock bolt 32 to be liftable from engagement in the clearance space 30, if the adjustable ring 26 is rotated by hand or by the key 29 opposing the chuck body 11. A locking device 34 can engage in an axial groove on a drill shaft inserted between the chuck jaws 5, in order to lock the drill securely in the drill chuck against rotary slipping.

This means is more fully described in the copending application Ser. No. 731,655.

I claim:

1. In a hammer drill apparatus comprising a drill chuck driven by a drill spindle, said drill spindle being hollow and having an axial passage through which a hammer stroke of a ram passing through the spindle is transmitted to an end of a drill bit held between centrally adjustable clamp jaws in said drill chuck, and wherein a plurality of catches are provided for mounting of said drill chuck on said drill spindle so as to prevent rotation of said drill chuck relative to said drill spindle, but to allow axial play of said drill chuck on said drill spindle unless said axial play is prevented by a shift member adjustably mounted on said drill chuck, the improvement wherein said catches are radially protruding lugs rigidly connected with said drill spindle, said lugs lying axially opposite a plurality of shift surfaces on opposite sides of said drill chuck, and in one rotary position of said shift member said lugs are locked in close contact with said shift surfaces so as to prevent said axial play of said drill chuck on said drill spindle, and in another rotary position of said shift member said lugs are positioned with clearance from said shift surfaces so as to allow said axial play.

2. The improvement according to claim 1·wherein said lugs are rigidly connected to a sleeve, said sleeve being attached to said drill spindle, and said sleeve is braced between a first circular shoulder of said drill spindle and a second circular shoulder of said chuck body inside a chuck body collar at an end of said chuck body adjacent said drill spindle.

3. The improvement according to claim 1 wherein said chuck has a chuck body with a collar on an end of said chuck body closest to said drill spindle, said collar being formed with catch recesses constituted as radially directed slots receiving said lugs, and said shift member is a shift ring mounted rotatably and axially unshiftable on said chuck body, an inner collar of said shift ring overhanging sides of said lugs directed axially toward said drill spindle, said shift ring having at least one of said shift surfaces thereon opposing said sides of said lugs directed toward said drill spindle.

4. The improvement according to claim 3 wherein sides of said catch recesses directed axially toward said drill spindle are open, a first one of said shift surfaces formed by a planar circular surface of said inner collar of said shift member preventing said axial play, and in said planar circular surface a plurality of indentations are provided corresponding to said plurality of catches, said indentations each having an axial depth equal to displacement of said drill chuck by said axial play, and by an appropriate rotation of said shift member said indentations are brought into registry with said catch recesses, so that said lugs can enter into said indentations, whereby bottoms of said indentations form a second one of said shift surfaces limiting said axial play.

5. The improvement according to claim 4 wherein side walls and bottoms of said slots forming said catch recesses and said bottoms of said indentations are formed as planar surfaces, said planar surfaces lying against corresponding planar surfaces of said lugs.

6. The improvement according to claim 5 wherein said shift member is mounted with said inner collar on said chuck body collar and with a supporting member of said shift member engaged in a circular undercut portion of said chuck body, said supporting member being positioned adjacent an end of said shift member closest to said jaws.

7. The improvement according to claim 6 wherein said support member is a compressible ring inserted into a circular groove in said shift member.

8. The improvement according to claim 3 wherein said shift member has a detent holding said shift member angularly fixed in either of said two rotary positions of said shift member.

9. The improvement according to claim 8 wherein said detent comprises a spring-loaded locking pin guided radially adjustably in said shift member and lock cavities in said chuck body associated with said locking pin.

10. The improvement according to claim 9 wherein said hammer drill apparatus is provided with two of said lugs, two of said catch recesses for said lugs, and two of said indentations.

11. In a hammer drill apparatus comprising a drill chuck for a work tool driven by a drill spindle of a drill, said drill spindle forming means for providing a hammer stroke to said work tool held between centrally adjustable clamp jaws in said drill chuck, wherein a plurality of catches are provided for mounting of said drill chuck on said drill spindle so as to prevent relative rotation of said drill chuck on said spindle, but to allow axial motion free play of said drill chuck on said drill spindle, unless said axial motion free play is prevented by adjustment of a shift member adjustably mounted on said drill chuck, the improvement wherein said catches are constructed as radially protruding lugs rigidly connected with said drill spindle, said lugs lying axially opposite a plurality of shift surfaces on opposite sides of said drill chuck, said lugs in one of two rotary positions are locked in close contact with said shift surfaces so as to prevent said axial motion free play of said drill chuck on said drill spindle, and in the other of said rotary positions said lugs are positioned with clearance from said shift surfaces so as to allow said axial motion free play.

* * * * *